F. SILLIX.
MAGAZINE GUN.
APPLICATION FILED AUG. 15, 1912.
1,115,979.
Patented Nov. 3, 1914.
8 SHEETS—SHEET 1.
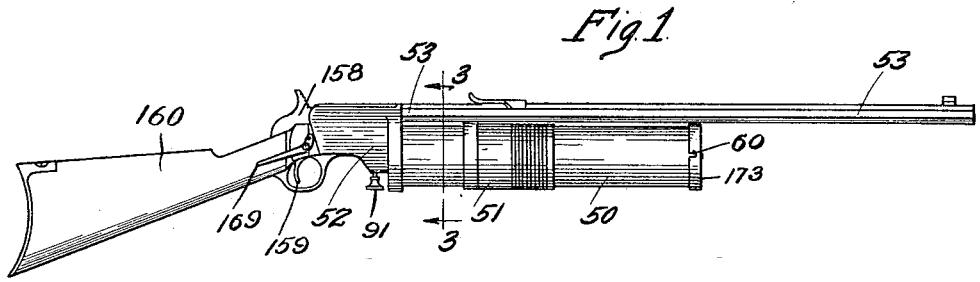
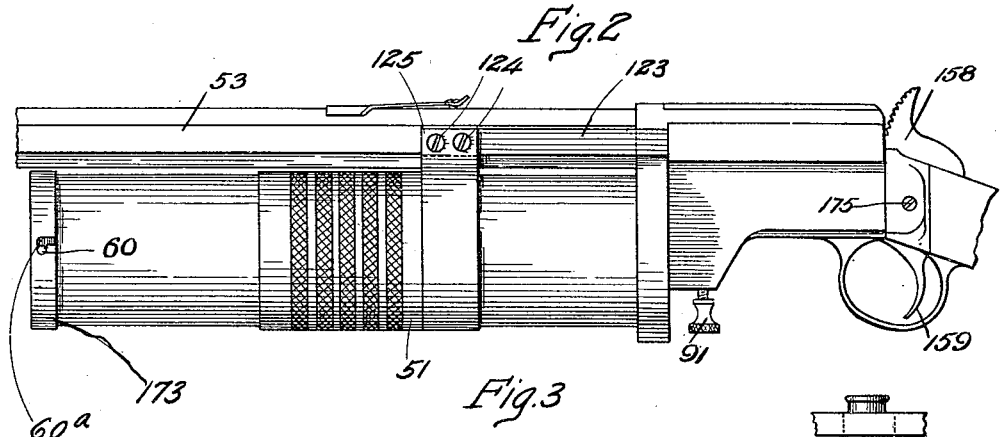
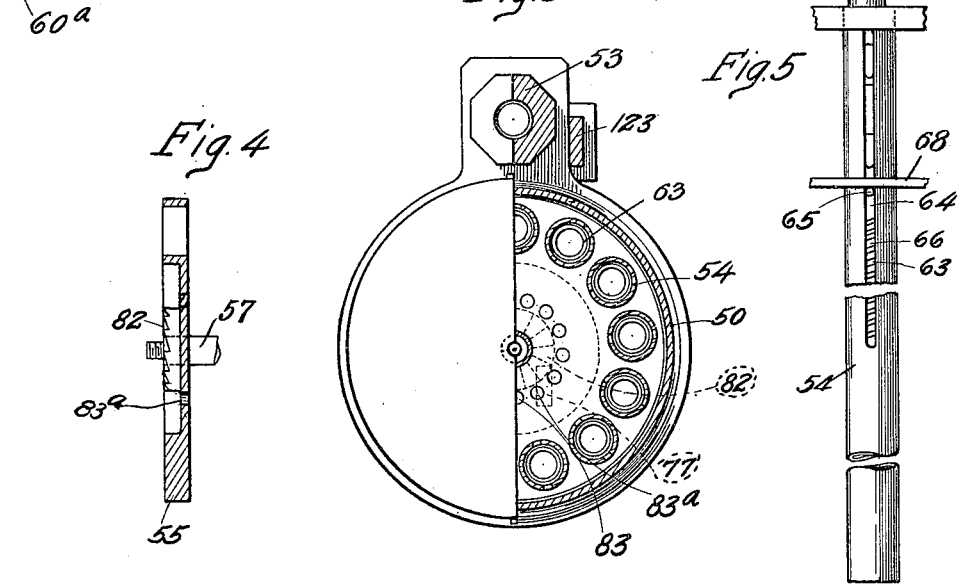
Witnesses:
C. E. Burnap
Henry A. Parks
Inventor:
Frank Sillix
By Sheridan, Wilkinson, Scott, Richmond Atty's

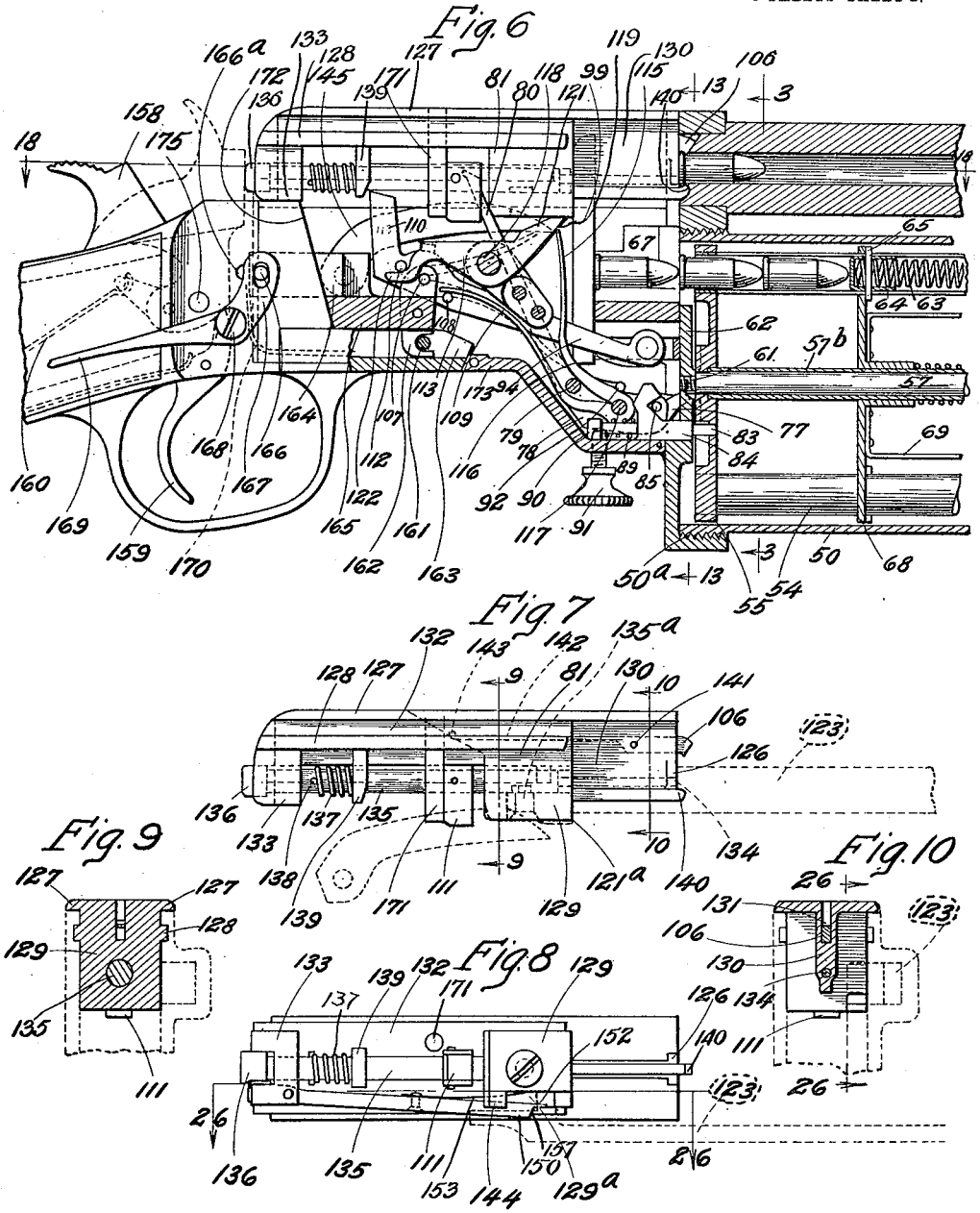

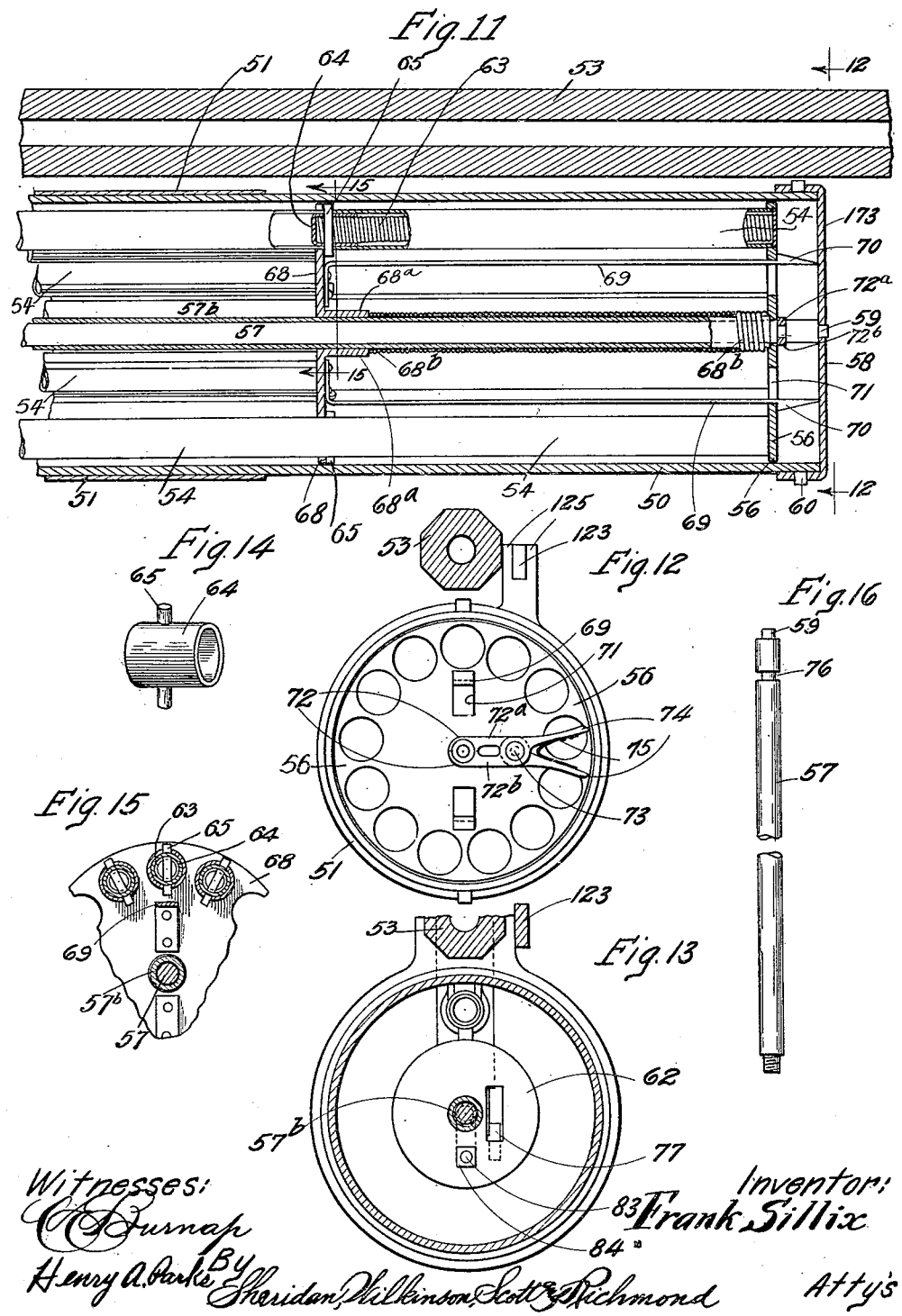

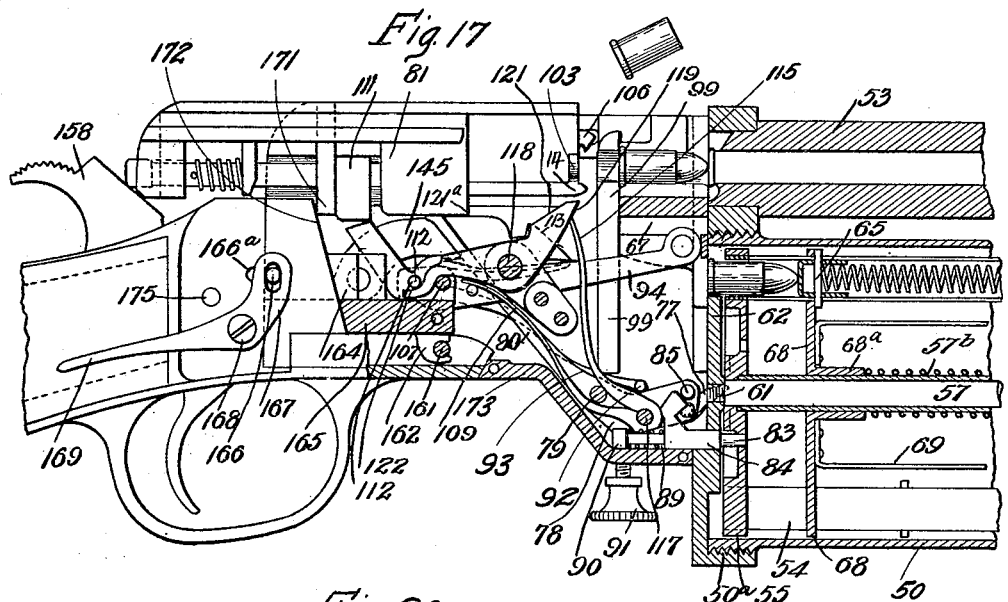
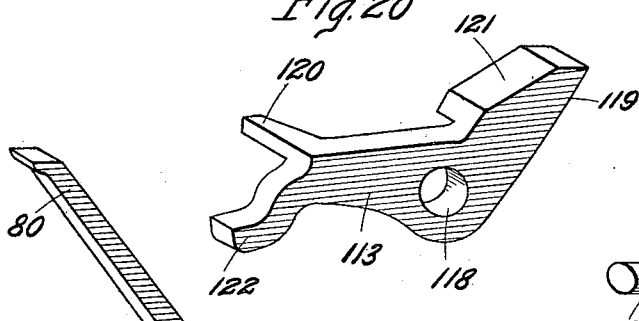
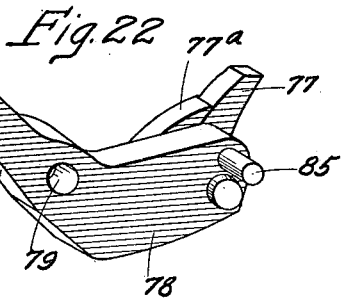

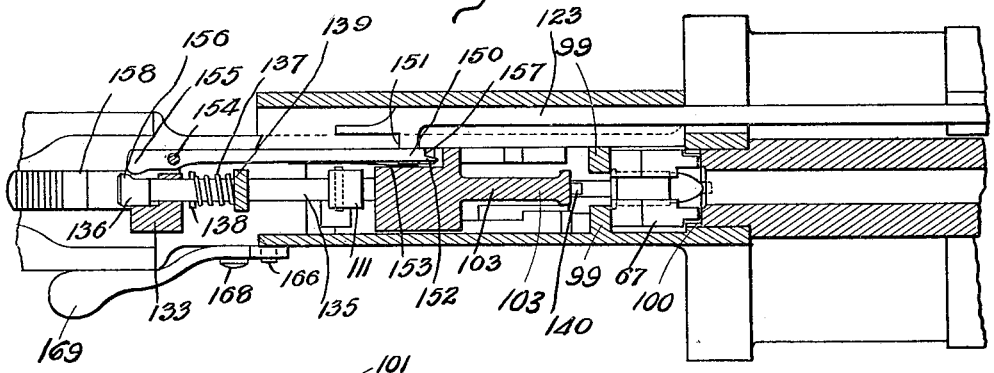

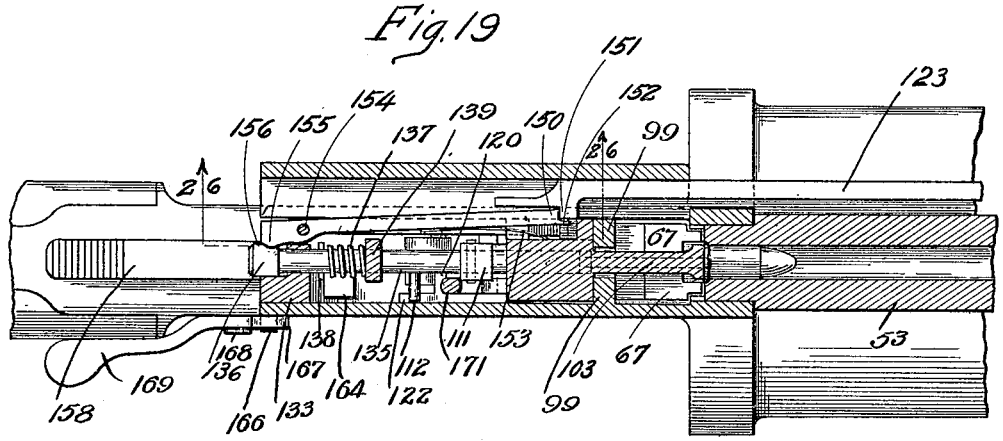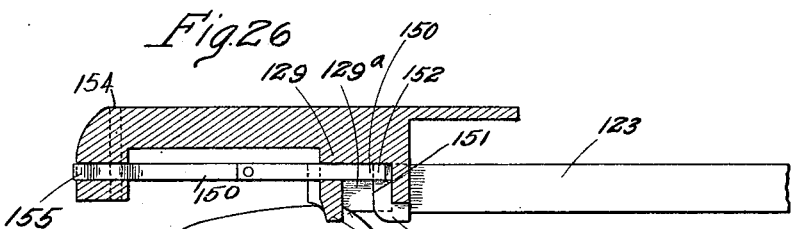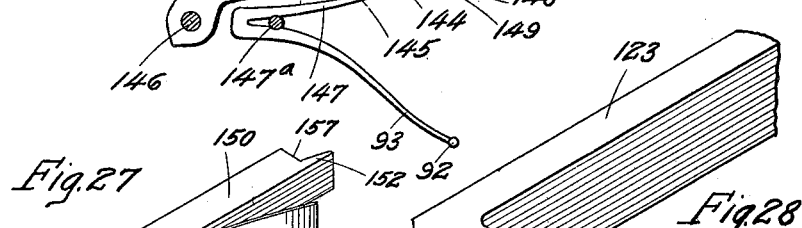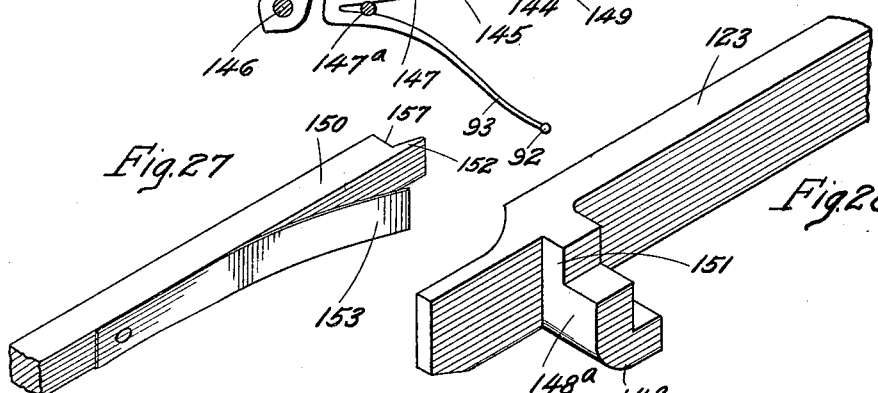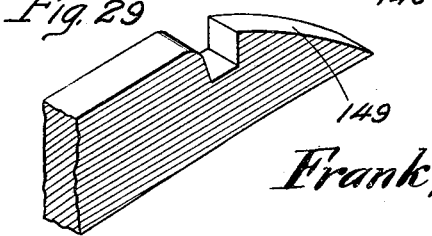

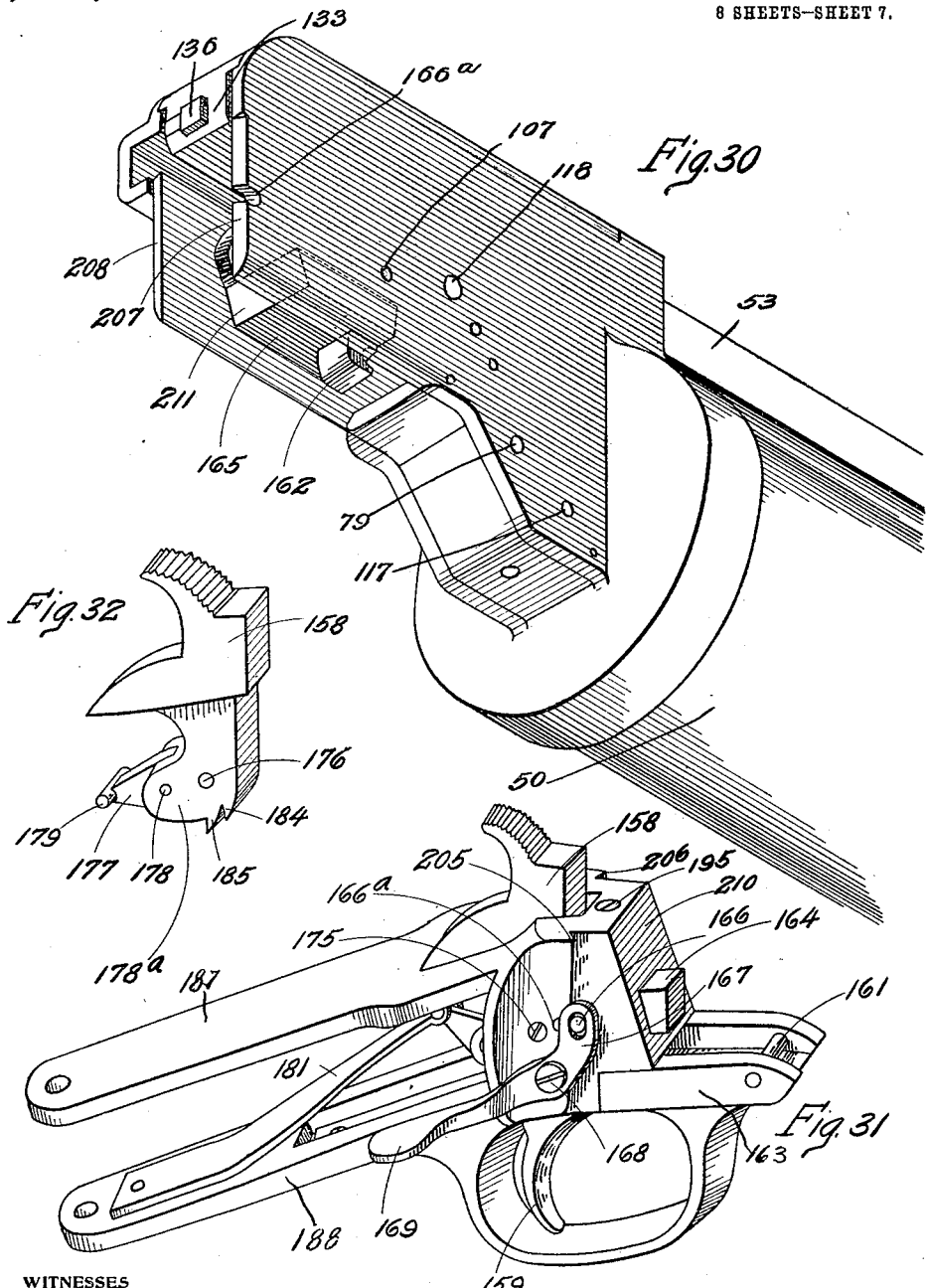

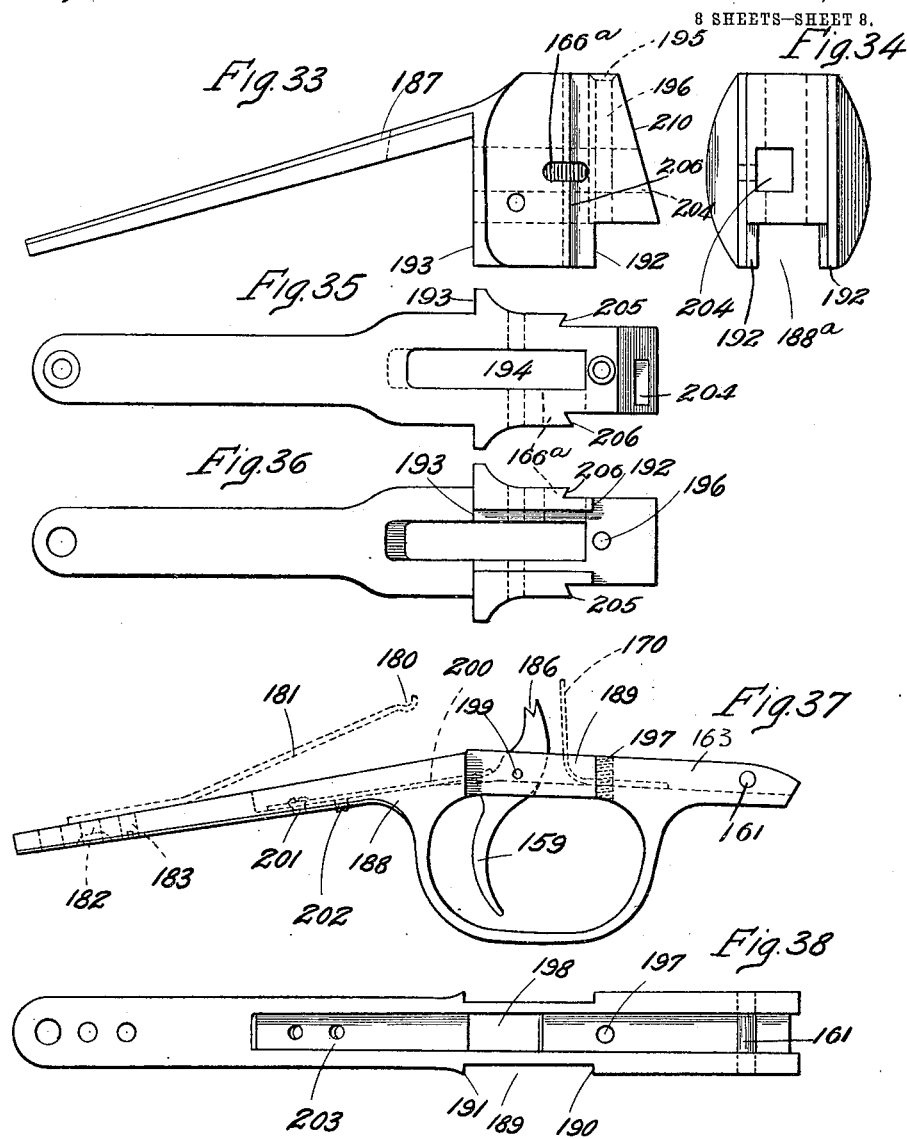

UNITED STATES PATENT OFFICE.

FRANK SILLIX, OF TOPEKA, KANSAS, ASSIGNOR OF THREE-EIGHTHS TO GEORGE FRASER, OF TOPEKA, KANSAS.

MAGAZINE-GUN.

1,115,979.  Specification of Letters Patent.  Patented Nov. 3, 1914.

Application filed August 15, 1912. Serial No. 715,233.

*To all whom it may concern:*

Be it known that I, FRANK SILLIX, a citizen of the United States, residing at Topeka, in the county of Shawnee and State of Kansas, have invented a certain new and useful Magazine-Gun, of which the following is a specification.

My invention relates to magazine guns of large capacity in which a large number of shots can be fired without reloading.

The object of my invention is to produce a gun of this character, which shall be safe and reliable, and which shall not have excessive weight.

A further object is to produce a gun that shall be well balanced, compact, and pleasing in design.

My invention is intended for military use, for gallery use, and for all purposes for which a gun of this character is desired.

The gun is provided with a revolving magazine containing a number of tubes, in which the cartridges may be placed previously to the insertion of the magazine in the gun. The cartridge-holding tubes are secured together in a compact form and arranged about a common axis, and may be loaded and carried separately from the gun ready for insertion therein when needed. The gun is provided with mechanism for automatically bringing a large number of cartridges successively into alinement with the bore of the barrel, by simple movements of the operator's hand, in proper order, until the entire magazine is empty.

My invention comprises a sliding breech-block which is removable, and thereby allows a cleaning-rod to be inserted at the breech end of the barrel. The breech-block can be removed without the aid of tools by simply moving the slide backwardly when the gun is unlatched. I provide a safety catch for the said breech-block to insure its being held in place when the gun is fired.

Among other features in my present invention are the cartridge-carrier latch or lock, means for insuring positive return of the cartridge-carrier to its normal position, a take-down mechanism, and other features which will be made apparent in the following specification, when taken in connection with the accompanying drawings, in which—

Figure 1 is a side elevation of my improved gun. Fig. 2 is a side elevation viewed in the opposite direction to that of Fig. 1, on a larger scale, showing the magazine portion of the gun. Fig. 3 is an end view, partly in section, taken along the line 3, 3 of Fig. 1. Fig. 4 is a sectional detail of the rear head of the revolving mechanism. Fig. 5 is a detail showing one of the cartridge-holding tubes of said magazine. Fig. 6 is a longitudinal vertical section, taken through the breech portion of the gun and through the rear end of the magazine. Fig. 7 is a detail showing the sliding breech-block in elevation. Fig. 8 is an inverted plan view of the same. Fig. 9 is a cross section of said breech-block, taken along the line 9, 9 of Fig. 7. Fig. 10 is a cross section of said block, taken along the line 10, 10 of Fig. 7. Fig. 11 is a longitudinal section of the forward end of the revolving magazine, together with its casing and a portion of the barrel of the gun. Fig. 12 is a cross section along the line 12, 12 of Fig. 11, showing the revolving magazine in elevation but with the cap removed. Fig. 13 is a cross section substantially along the line 13, 13 of Fig. 6, showing in elevation the lower portion of the breech piece of the gun with the revolving magazine removed. Fig. 14 is a perspective view enlarged of one of the cartridge-moving followers in the tubes. Fig. 15 is a sectional detail, taken along the line 15, 15 of Fig. 11. Fig. 16 is a detail showing the spindle upon which the revolving magazine is mounted. Fig. 17 is a longitudinal vertical section of the breech portion of the gun similar to Fig. 6, but with the breech-block moved to its rearmost position. Fig. 18 is a horizontal section of the breech portion of the gun, taken substantially along the line 18, 18 of Fig. 6, and with the breech-block in its rearmost position. Fig. 19 is a horizontal section of the breech portion of the gun with the breech-block in its forward or firing position. Fig. 20 is a perspective view enlarged of the cartridge-carrier lever lock. Fig. 21 is a perspective view enlarged of the revolving magazine lock. Fig. 22 is a perspective view enlarged of the revolving lever. Fig. 23 is a perspective view enlarged of the cartridge-carrier and ejector. Fig. 24 is a perspective view enlarged of the same cartridge-carrier viewed in a different direction. Fig. 25 is a perspective view enlarged of the cartridge-carrier lever. Fig. 26 is a sectional view of the breech-block and some of the associated parts, taken substantially along the line 26, 26 of Fig. 19. Fig. 27 is a perspective view enlarged of a portion of the safety catch. Fig. 28 is a perspective view enlarged of a portion of the connecting bar by which the breech-block is actuated. Fig. 29 is a perspective view enlarged of a portion of the breech-block bolt. Fig. 30 is a perspective view of the rear portion of the magazine, showing more particularly the breech casing and the method of attaching the stock. Fig. 31 is a perspective view of the back action frame and mechanism therein contained, which is attached to the forward end of the stock. Fig. 32 is a perspective view of the hammer. Fig. 33 is an elevation of the upper portion of the back action frame. Fig. 34 is an end elevation of the same. Fig. 35 is a plan view of the same. Fig. 36 is an inverted plan view of the same. Fig. 37 is a side elevation of the lower portion of the back action frame. Fig. 38 is a plan view of the same.

Referring more particularly to Fig. 1, it will be seen that I have provided a magazine 50 of large capacity, which I have disposed beneath the rear half of the barrel 53. The rear ends of said barrel and magazine lie in the same vertical plane and are attached to a breech casing 52. The magazine comprises an outer shell 50 which is rigidly secured to said breech casing 52, it being preferably threaded therein, as shown at 50ª in Fig. 6. Upon the barrel of said casing 50 slides a sleeve 51 by which the operator of the gun may actuate the cartridge-controlling mechanism in the breech casing. By means of the sleeve 51, the operator actuates the breech-block, moves a cartridge into firing position, extracts the preceding shell, rotates the magazine to a position for supplying a new cartridge, and sets the hammer to a position ready for firing. The sleeve 51 is given a reciprocating movement by the operator when accomplishing the above described results.

Referring now more particularly to Figs. 3, 4, 5, 6 and 11, it will be seen that the magazine comprises a number of tubes 54 which are rigidly secured at their ends to the heads 55 and 56. The said heads are loosely mounted upon an axial spindle 57 which is secured to the breech casing at its rear end by the threaded end 61 and is supported at its forward end by the reduced portion 59 which is loosely supported in the cap 58. The cap 58 is attached to the shell 50 which incloses the magazine, by the pins 60 which enter the angular notches 60ª in said cap, forming a connection commonly known as a bayonet joint.

The breech casing is provided with a circular boss 62 which projects inwardly into the magazine chamber and which receives the threaded end of the spindle 57, besides serving as a desirable spacing means for said magazine with relation to said casing.

Within each of the tubes 54 is a spiral spring 63 adapted to exert a pressure upon the follower 64 to press the cartridges in said tubes backwardly toward the breech portion of the gun. Each of the followers 64 is provided with a pin 65 driven entirely through it and projecting beyond its surface and sliding at its ends in the slots 66 in said tubes. As will be clearly seen in Fig. 6, the function of the spring 63 is to press the cartridges backwardly into the cartridge-carrier 67 by which they are elevated to a position in alinement with the axis of the barrel. The cartridge is subsequently pushed into the barrel to its firing position by the breech-block, as will be described later.

In order to return each of the followers to the forward end of the magazine to permit reloading thereof when it has been removed, I provide a circular plate or disk 68 having a series of apertures receiving the tubes 54 and adapted to slide also upon the central tube 57ᵇ inclosing the spindle 57. This disk is disposed behind the pins 65 and by means thereof it may be used to force all of said followers to a position near the forward end of the magazine. In order to retain the disk in this position while cartridges are being inserted in the tubes, I provide the spring hooks 69, whose ends 70 are adapted to pass through the apertures 71 in the forward head of the magazine and engage the said head.

The disk 68 is provided with a hub 68ª which is fitted to the tube 57ᵇ and serves to guide said disk and hold it in a position at right angles to the axis of the magazine. This hub 68ª will thereby prevent a tilting or angular position of the disk which might cause binding and prevent the smooth action thereof. The disk is pushed backwardly toward the breech end of the gun by the spring 68ᵇ which is concentrically disposed around the tube 57ᵇ. The tube 57ᵇ is fitted at its ends into recesses in the heads 55 and 56 and does not bear upon the spindle 57. The tube serves to guide the spindle through the magazine.

In order to retain the magazine in its proper position in the casing 50 and in close relation to the breech casing, I provide a locking device 72, which engages an annular groove 76 in the spindle 57. This locking device comprises two pointed levers 72ª and 72ᵇ which are pivotally mounted upon the pin 73 fixed in the head 56. The ends of the said levers are provided with semicircular notches to engage said annular groove and at their opposite ends are suitably formed to receive the pressure of the fingers of the operator's hand to disengage them from said spindle. A spring 75 yieldably holds them in engagement with said spindle.

The magazine is rotated by the pawl 77 which is pivoted to and carried by the revolving lever 78, which in turn is mounted upon a pin 79 in the breech casing. The said lever is provided with an upwardly projecting arm 80 by which it is actuated by the breech-block 81. The pawl 77 engages the radially disposed teeth 82 in the rear head 55 of the revolving magazine. The movement of the breech-block 81 in a rearward direction will, therefore, be seen to produce a rotary movement of said magazine.

The magazine is locked in position at all times, except during the period of rotary movement, by the pin 83 which projects forwardly from the main body of the locking device 84. The locking device 84 is given a reciprocating movement by a pin 85 which projects laterally from the lever 78 and bears upon the inclined faces 86 and 87 thereof and by means of which the movement of the pin forces said locking device backwardly while the revolving lever 78 is in motion. The locking device 84 is provided with a rearward extension 88 which slides in a guide 90 fixed to the casing. A spring 89 inclosing said extension presses the locking device forwardly to its locking position when it is not being pressed backwardly by said pin 85. In the head 55 I have provided a circular series of holes 83ª equal in number to the cartridge containing tubes 54 and suitably disposed with relation thereto, to hold each of said tubes in alinement with the cartridge-carrier 67 when it has been rotated to that position.

The revolving lever 78 is normally pressed downwardly and forwardly by the laterally projecting end 92 of the spring 93. The said revolving lever may be forced upwardly and retained in an elevated position by the thumb-screw 91, whereby it will then be held out of action and the movement of the breech-block will not effect a rotary movement of the magazine. When thus adjusted, a single tube in the magazine will remain in alinement with the cartridge-carrier until all of the cartridges therein have been used. This feature is desirable when the gun is used for gallery firing, in which it is desired to keep an account of the number of shots fired.

The cartridge-carrier 67 is actuated in a vertical direction by means of a lever 94, said lever being provided at its forward end with laterally projecting trunnions 95 which work in slots 96 within the body of said carrier. These trunnions bear upon the upper and lower faces 97, 98 of said slots.

The cartridge-carrier 67 is guided in a vertical direction by the guide bars or ribs 99, 100, which preferably are integral with the breech casing. The ribs 100 enter the recesses or grooves 101 in said carrier. The carrier is provided with a hollow cylindrical chamber 102 for receiving cartridges one at a time from the tubes 54. When the cartridge reaches its uppermost position, as shown in Fig. 17, it is ready to be pushed into the barrel by the forward portion 103 of the breech-block. The carrier is provided with upwardly projecting portions 104 which are adapted to engage the empty shell of the preceding cartridge and force it upwardly and cause it to turn about the hooked end 106 of the shell extractor.

The cartridge-carrier lever 94 is pivotally mounted in the breech casing upon a pin 107. A pin 108 fixed in said lever receives the downward pressure of the spring 109 which moves said lever, and with it said carrier, to its lower position. The upwardly extending arm 110 of said lever is adapted to receive the pressure of the block 111 carried by the breech-block when said breech-block is moving rearwardly and to so operate said lever as to move the cartridge-carrier to its upper position. The said lever 94 also carries a pin 112 which is adapted to receive the pressure of a lever 113 actuated by the breech-block in its forward stroke, and thereby to cause the positive return of said lever 94, and hence the cartridge-carrier, to its normal position.

The lever 113 has for its principal function the locking of said lever 94 in its uppermost position, thereby retaining it in said position until the breech-block has been given its forward stroke. The lever 113, as shown more particularly in Fig. 20, is provided with a laterally projecting tongue or lug 120 which is adapted to drop behind the lug 114 of the lever 94 when said lever has reached its uppermost position. The said lever 113 is also provided with a downwardly and rearwardly extending arm 122 which bears upon the lower side of the pin 112 and which effects the positive return of said lever 94 to its normal position, as previously described. The lever 113 is pivotally mounted upon a pin 118 secured in the breech casing and is provided with an upwardly projecting portion 119 which is struck by the breech-block in its forward stroke. The inclined face 121 of said lever receives the pressure of the forward lower edge 121ª of the breech-block. Said lever 113 is moved in the opposite direction by the forward portion 115 of the spring 109. This spring is held in position by the lower corner 116 of one of the guide bars 99 and by the pin 117.

The breech-block is actuated by the connecting bar 123 extending from the sleeve 51 back to said breech-block. The bar 123 is fixed to said sleeve by means of the screws 124 which are inserted through the jaws 125 and through the end of said bar. The breech-block is provided ats forward end with a cylindrical portion integral therewith, as shown at 126, which is adapted to bear upon the head of the cartridge and press it into position in the barrel. This block is also provided with horizontal flanges 127 which bear upon the edges of the breech casing. It is also provided with the ribs 128 which slide in grooves in said casing. The main body 129 of the breech-block lies immediately behind the narrow forward portion 130, said narrow portion having the general form of the letter T. The rear portion of said block 132 terminates in a downwardly projecting portion 133 in which is slidably mounted the body portion of the firing pin 135. Said pin terminates in a head 136 at its rear end where it receives the stroke of the hammer. A spring 137 normally presses the firing pin rearwardly, a pin 138 inserted in said firing pin serving to transmit the spring pressure thereto. The lug 139 receives the pressure of the stationary end of the spring. The forward end 134 of the firing pin is reduced in size where it engages the cartridge. The stroke of the pin is limited by a small screw 135$^a$ whose end projects into a notch in the pin.

The forward end of the breech-block is provided with a forwardly projecting lug 140 which engages the under side of the cartridge and coöperates with the hook 106 in extracting the shell. The hook 106 is secured in place in the groove 131 by the pin 141. The rear portion 142 of said hook is made thin and elastic and bears at its extreme rear end 143 upon the inclined bottom of the groove. The forward end 106 is thereby permitted to yield and engage the shell.

The body portion 129 of the breech-block is recessed at 129$^a$ in such a manner as to form the downwardly and laterally projecting lug 144 which is adapted to engage the locking member 145 and cause the block to be held securely in place thereby. Said locking member is pivotally attached to the breech casing by the pin 146. A spring 147 exerts a tension against said locking member and normally tend to hold it securely in engagement with said block. The spring 147 is preferably integral with the spring 93 previously referred to, the two portions of said spring being adapted to exert tensions in opposite directions. The spring is anchored in its proper position by the pin 147$^a$.

The connecting bar 123 is adapted to disengage the locking member 145 from the breech-block before the backward sliding movement is imparted to said block. The initial portion of the backward movement of the bar 123 causes the downwardly and inwardly projecting portion 148 thereof to strike the curved and sloping end 149 of the locking member 145 and push it downwardly out of engagement with the lug 144. When this unlocking has been accomplished the rear face 148$^a$ of said lug strikes the lug 144 of the breech-block and causes the rearward motion of the block to take place.

The above described parts are held in check by a safety catch 150 until the firing pin 136 has been struck by the hammer and pressed forward. The safety catch 150 bears at its end 157 upon the rear face 151 of the inwardly extending portion of the connecting bar until it has been moved away from it by said firing pin. A spring 153 attached to the said safety catch 150 bears upon the body of the breech-block and normally holds said safety catch in position until released, as above described. A forwardly extending lug 152 maintains the proper relation of said catch to the connecting bar.

The safety catch 150 is pivotally attached to the rear portion of the breech-block by the pin 154. Beyond the said pin 154 is an inwardly projecting portion 155 adapted to receive the pressure of an inclined face of an outwardly projecting portion 156 of the firing pin to cause an oscillation of said safety catch. When the hammer strikes the head 136 the safety catch will be moved away from the path of the connecting bar 123 and said bar then is free to disengage the locking member 145 from the breech-block and to slide the block rearwardly. The hammer 158 and the trigger 159 have a form and mode of operation well known in the art and it is unnecessary to describe them in detail.

The stock 160 is removably attached to the breech casing by means of a pin 161 in the back action frame which engages a hooked portion 162 of said casing and by means of the sliding bolt 164 which is carried in the back action frame attached to said stock and engages a transverse bridge or connecting portion 165 in said casing between the walls thereof. The hooked portion 162 enters a groove in the forwardly extending portion 163 of the back action frame. The bolt 164 is provided with a laterally projecting pin 166 which works in a slot 166$^a$ and is engaged and actuated by a lever 167 pivotally attached to the back action frame by the pin 168. A rearwardly extending portion 169, suitably formed to receive the pressure of the operator's thumb, permits the operation of said lever in sliding the bolt 164 backwardly to permit taking down the gun. A spring 170 normally presses the bolt forwardly to cause it to snap into locking position when the stock has been moved to its normal position with relation to the body of the gun.

The breech-block is provided with a downwardly projecting pin 171 which strikes the sloping face 172 of the back action frame, and thereby serves as a stop for the rearward stroke of said breech-block. The back action frame is given a sloping face to permit said frame to swing into its closed position without interference with the connecting bridge 165. Said connecting bridge 165 is also suitably inclined upon its rear face to properly engage with said back action frame.

The back action frame is composed of two parts 187 and 188 which have rearwardly extending portions fitted to the wood of which the body of the stock is composed. The upper portion of the frame is forked at its under side, as shown at 188$^a$, to permit it to fit over the reduced portion 189 of the lower member of the frame. The shoulders 190 and 191 are fitted against the forward and rear edges 192 and 193, respectively, on the upper portion. The upper and lower portions are secured to each other by a screw 195 which passes downwardly through the aperture 196 and is threaded into the lower portion at 197. The upper portion is provided with a longitudinal slot 194 into which the hammer 158 is fitted. A pivot pin 175 is fitted into the upper portion and serves as a bearing for the hammer. The lower portion carries the trigger 159 which is inserted in a slot 198 and pivotally held in place by a pin 199. The trigger is normally held in a forward position by the spring 200 which is secured to the lower portion of the back action frame by the screw 201. The spring is adjusted by a small screw 202. The spring lies in a slot or groove 203 in the lower portion of said frame. The lower portion of the frame also carries the main or hammer spring 181 which is secured to the said frame by the screw 182 and adjusted by a screw 183. The forward end of the spring 181 is provided with a hooked end 180 which engages the end 179 of a small link 177, which in turn is pivotally attached at 178 to the rearwardly extending arm 178$^a$ of the hammer. The lugs 184 and 185 on the hammer are engaged by the upper end 186 of the trigger when the hammer is drawn back. The upper portion 187 of the back action frame is provided with a longitudinal rectangular guide aperture 204 to receive the locking bolt 164. This aperture is preferably placed nearer to one side than the other in order that said bolt may clear certain portions of the mechanism in the breech casing. The dovetail portions 205 and 206 receive the bevel edges 207 and 208 of the breech casing and securely hold the parts together when the gun is closed and locked by the bolt 164.

The operation of my improved gun has already been largely referred to, but the following remarks may be added thereto. In filling the magazine the cap 173 is first removed from the casing 50, after which the operator may press upon the ends 74 of the retaining device 72 which disengages the magazine from the spindle 57, allowing it to be drawn endwise out of said casing and off said spindle. The operator then slides the plate 68 along the tubes 54 and presses all of the followers 64 along said tubes against the tension of the springs 63. The pins 65 permit said plate to effect this movement of the followers. The operator moves the plate 68 along, as above described, until the heads 70 of the hooks 69 pass through the apertures 71 and engage the head 56 of the magazine. The plate 68, and hence the followers, will then be retained in their forward position. The operator is now enabled to fill the tubes with cartridges, after which the magazine may be again inserted in position in the casing 50, and the retaining device 72 allowed to engage the groove 76 in the spindle 57. The hooks 70 may be now released by pressing upon them with the thumb and finger and the cap 173 may be placed in position. The tension of all the springs 63 will force the cartridges toward the rear end of the magazine and the uppermost series of cartridges in the upper tube will be pushed back far enough to cause the end cartridge to be moved into the cartridge-carrier 67.

The operator may bring the cartridge into position for firing by grasping the sleeve 51 with his hand and sliding it backwardly, which will cause the connecting bar 123 to disengage the locking member 145 from the breech-block and then to push the said breech-block rearwardly. This action causes the small block 111 to strike the shell carrier lever 94, which in turn lifts the shell carrier 67 into alinement with the barrel. It is locked in this position by the lever 113, which is actuated by the spring 115 to move the lug 120 into engagement with the lug 114. The operator now will move the sleeve 51 forwardly and the breech-block 81 will thereby be caused to push the cartridge out of the carrier into said barrel.

The forward movement of the breech-block will cause the edge 121$^a$ thereof to strike the lever 113 and cause it to unlock the cartridge carrying lever 94, while at the same time the downwardly curved arm 122 will strike the pin 112 and positively actuate the lever 94 in a manner such as to move the cartridge-carrier to its lowermost portion. In this position it is ready to receive another cartridge from the uppermost tube of the magazine, which will be pushed into said carrier by the spring 63. In the forward stroke of the breech-block the locking member 145 will, of course, engage said breech-block and hold it securely in position. The safety catch 150 will also spring into position behind the connecting bar 123 and prevent operation thereof until the hammer is down. After the gun is fired, the said safety catch will be moved out of said position by the head of the firing pin and the operation of the locking bar 123 will be permitted, as previously described. The shell is extracted from the barrel by the hook 106, and thrown out by the carrier 67, when the breech-block is moved back. Each complete movement of the breech-block causes the revolving lever 78 to impart a rotary movement to the magazine to a sufficient extent to move another and an adjacent tube into alinement with the carrier. The locking pin is withdrawn during the period of said rotary movement.

Referring more particularly to Figs. 30 and 31, it will be seen that the stock of the gun can be very conveniently attached to the body of the gun by first causing the pin 161 to engage the concave portion of the downwardly projecting hook 162. The stock may be then swung upwardly into alinement with the body of the gun until the sloping face 210 of the back action frame meets the sloping face 211 of the transverse bridge 165. During this operation, the bolt 164 may be pressed backwardly by the thumb lever 169 until the parts are closed, when the spring 170 causes the bolt to slide forwardly and lock the parts together.

Referring more particularly to Fig. 17 it will be seen that the breech block may be easily removed. To do this it is necessary only to swing the back action frame and stock downward out of the way. The barrel and other parts may then be readily cleaned from the breech end.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:

1. In a gun, a barrel, a plurality of cartridge holding elements parallel with, under, and independent of said barrel, means for carrying cartridges from said elements to said barrel, a breech block for said barrel, means by which said breech block may actuate said carrying lever and pawl mechanism, and means by which said breech block may move said elements automatically into position to deliver cartridges to said carrying means or permit them to be manually moved to said position.

2. In a gun, a barrel, a plurality of cartridge holding elements adjacent said barrel, a breech block, means actuated by said breech block for carrying cartridges from said elements into said barrel, means actuated by said breech block for moving said elements in succession into position to deliver cartridges to said carrying means, and means for preventing said movement of said elements and permitting the operation of one alone.

3. In a gun, a barrel, a plurality of cartridge holding elements adjacent said barrel, a breech block, means actuated by said breech block for moving cartridges from said elements into said barrel, means for actuating said breech block, a lock member for said breech block, and a safety catch carried by said block to stop said actuating means when the gun is set for firing.

4. In a gun, a barrel, a revolving cartridge holding magazine independent of, parallel with and below said barrel, means for carrying cartridges from the rear of said magazine to said barrel, a breech block for said barrel adapted to actuate said carrying means, and lever and pawl mechanism actuated by said block to revolve said magazine to a position to deliver cartridges to said block.

5. In a gun, a barrel, a revolving magazine independent of and mounted adjacent said barrel, a fixed casing for said magazine, a sliding element mounted on said casing, a breech block, and means by which said element may actuate said block.

6. In a gun, a barrel, a revolving magazine independent of and mounted adjacent said barrel and comprising a plurality of cartridge holding tubes, a casing for said magazine separate from and inclosing said tubes, a sliding element mounted on said casing a breech block, and a rod attached to said sliding element and having a limited sliding movement with relation to said block.

7. In a gun, a barrel, a revolving magazine independent of and mounted adjacent said barrel, a casing for said magazine, a sliding element mounted on said casing, a breech block, a rod attached to said sliding element and having a limited sliding movement with relation to said block, means for locking said block in position to close the breech of said barrel, said means being disengaged from said block by said rod in said limited sliding movement, a firing pin, and means actuated by said firing pin for controlling said limited sliding movement.

8. In a gun, a barrel, a revolving magazine, independent of and mounted adjacent said barrel, a casing for said magazine, a sliding element mounted on said casing, a breech block, a rod attached to said sliding element and having a limited sliding movement with relation to said block, means for locking said block in position to close the breech of said barrel, said means being distacle and centrally of said strips, are alined, limited sliding movement, a firing pin, and a safety catch in the path of said rod for preventing said limited sliding movement when the gun is set for firing, said catch being removed from said path by said pin when said gun is fired.

9. In a gun, a barrel, a plurality of cartridge holding elements movably mounted in a circular series independent of, parallel with and below said barrel, means for carrying said cartridges from said elements to said barrel, lever and pawl mechanism for moving said elements successively into position to deliver cartridges to said carrying means.

10. In a gun, a barrel, a plurality of cartridge holding elements movably mounted in a circular series independent of, parallel with and below said barrel, means for carrying said cartridges from said elements to said barrel, lever and pawl mechanism for moving said elements successively into position to deliver cartridges to said carrying means, and means for moving cartridges from said elements to said carrying means.

11. In a gun, a barrel, a plurality of cartridge holding elements movably mounted in a circular series adjacent said barrel, means for carrying said cartridges from said elements to said barrel, means for moving said elements successively into position to deliver cartridges to said carrying means, and means in each element for moving cartridges to said carrying means, and means for retracting all said last named means simultaneously.

12. In a gun, a barrel, a plurality of cartridge holding elements independent of and mounted adjacent said barrel, means for carrying cartridges from said elements to said barrel, means for moving said elements sucessively into and out of position to deliver cartridges to said carrying means, and means for preventing the operation of said last named means to permit one of said elements to remain in said position.

13. In a gun, a movable breech block, a locking element for said block, means having a shoulder and actuated by the operator for displacing said locking element and moving said block, and a safety catch engaging said shoulder for preventing the operation of said means when the gun is set for firing.

14. In a gun, a movable breech block, a firing pin carried by said block, a locking element for said block, and means actuated by said firing pin and separate therefrom for preventing the release of said element when the gun is set for firing.

15. In a gun, a barrel, a magazine, a movable breech block for said barrel, a carrying lever actuated by said block for carrying cartridges from said magazine to said barrel, and a locking lever engaging said carrying lever for retaining said carrying lever to hold the carrier adjacent said barrel after the movement of said block in one direction has been completed.

16. In a gun, a barrel, a magazine, a movable breech block for said barrel, a carrying lever actuated by said block for carrying cartridges from said magazine to said barrel, a locking lever engaging said carrying lever for retaining said carrying lever to hold the carrier adjacent said barrel after the movement of said block in one direction has been completed, and means for releasing said carrying means in the return movement of said block.

17. In a gun, a barrel, a magazine, a movable breech block for said barrel, a carrying lever actuated by said block for carrying cartridges from said magazine to said barrel, a locking lever engaging said carrying lever for retaining said carrying lever to hold the carrier adjacent said barrel after the movement of said block in one direction has been completed, means for releasing said carrying lever in the return movement of said block, and means for positively returning said carrying means to a position adjacent said magazine.

18. In a gun, a barrel, a removable breech block for said barrel, a hammer in alinement with said breech block and normally preventing its removal, and a hammer frame movable out of said alinement to permit removal of said breech block.

19. In a gun, a barrel, a revolving magazine containing a number of tubes for holding cartridges, means for carrying cartridges from said tubes to said barrel, followers in said tubes, said tubes having slots, springs for moving said followers, and pins projecting from said followers into said slots.

20. In a gun, a barrel, a revolving magazine containing a number of tubes for holding cartridges, means for carrying cartridges from said tubes to said barrel, followers in said tubes, springs for moving said followers, and a movable element for engaging all said followers and moving them simultaneously against said springs.

21. In a gun, a barrel, a revolving magazine containing a number of tubes for holding cartridges, means for carrying cartridges from said tubes to said barrel, followers in said tubes, springs for moving said followers, a movable element for engaging all said followers and moving them simultaneously against said springs, and means for retaining said element in position against the tension of said springs.

22. In a gun, a barrel, a revolving magazine, a spindle on which said magazine is rotatably mounted, said spindle having an annular groove, means carried by said magazine and adapted to engage said groove, and means for carrying cartridges from said magazine to said barrel.

23. In a gun, a barrel, a removable breech block for said barrel movable in alinement therewith, a hammer in alinement with said barrel and normally preventing removal of said block, and a stock to which said hammer is pivoted, said stock being pivoted to said barrel, whereby said hammer may be moved out of alinement with said barrel to permit removal of said block.

24. In a gun, a barrel, a removable breech block for said barrel movable in alinement therewith, a hammer in alinement with said barrel and normally preventing removal of said block, a stock to which said hammer is pivoted, said stock being pivoted to said barrel, whereby said hammer may be moved out of alinement with said barrel to permit removal of said block, and means for locking said stock in normal relation to said barrel whereby said hammer prevents the removal of said block.

25. In a gun, a barrel, a plurality of cartridge holding elements parallel with, under, and independent of said barrel, means for carrying cartridges from said elements to said barrel, a breech block for said barrel, means to actuate said carrying means, and a lever and pawl mechanism actuated by said breech block to move said elements into position to deliver cartridges to said carrying means.

26. In a gun, a barrel, a breech block for said barrel, a stock removably attached to said barrel, a sliding bolt carried by said stock and engaging said barrel, and a lever carried by said stock and operating said bolt, said stock preventing the removal of said breech block from said gun except when said stock is removed from its normal position in relation to said barrel.

27. In a gun, a barrel, a plurality of cartridge holding elements removably mounted parallel with, below, and independent of said barrel, means for carrying cartridges from said elements to said barrel, a spindle on which said elements are rotatably mounted in a group, and means requiring a single movement for engaging said elements with and disengaging them from said spindle.

In testimony whereof I have subscribed my name.

FRANK SILLIX.

Witnesses:
JAMES B. MULLIN,
HENRY OTTO.

Corrections in Letters Patent No. 1,115,979.

It is hereby certified that in Letters Patent No. 1,115,979, granted November 3, 1914, upon the application of Frank Sillix, of Topeka, Kansas, for an improvement in "Magazine-Guns," errors appear in the printed specification requiring correction as follows: Page 6, line 57, after the word "carrying" insert the words and comma *means, and;* same page, line 58, strike out the comma and words ", and means"; page 7, strike out line 1, and insert the syllables and words *engaged from said block by said rod in said;* same page, line 13, before the word "lever" insert the word *and;* and that the said Letters Patent should be read with these corrections therein that the same may conform to the record of the case in the Patent Office.

Signed and sealed this 22nd day of December, A. D., 1914.

[SEAL.]

J. T. NEWTON,
*Acting Commissioner of Patents.*